(12) United States Patent
Matsuoka et al.

(10) Patent No.: US 9,744,516 B2
(45) Date of Patent: Aug. 29, 2017

(54) PROCESSING DEVICE AND PROCESSING METHOD

(71) Applicant: KOBE STEEL, LTD., Kobe-shi (JP)

(72) Inventors: Akira Matsuoka, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/781,841

(22) PCT Filed: Apr. 9, 2014

(86) PCT No.: PCT/JP2014/002040
§ 371 (c)(1),
(2) Date: Oct. 1, 2015

(87) PCT Pub. No.: WO2014/174781
PCT Pub. Date: Oct. 30, 2014

(65) Prior Publication Data
US 2016/0038901 A1   Feb. 11, 2016

(30) Foreign Application Priority Data

Apr. 22, 2013   (JP) .................................. 2013-089305

(51) Int. Cl.
*B01J 19/00*   (2006.01)
*B01J 19/24*   (2006.01)
(Continued)

(52) U.S. Cl.
CPC ......... *B01J 19/0013* (2013.01); *B01J 19/249* (2013.01); *F28D 9/0037* (2013.01);
(Continued)

(58) Field of Classification Search
CPC ........ B01J 19/00; B01J 19/0013; B01J 19/24; B01J 19/248; B01J 19/249;
(Continued)

(56) References Cited

U.S. PATENT DOCUMENTS

| 7,858,829 B2 * | 12/2010 | Hubel ................. B01J 19/0093 |
| | | 568/620 |
| 2007/0077179 A1 * | 4/2007 | Schmalz ........... B01F 15/00935 |
| | | 422/400 |

FOREIGN PATENT DOCUMENTS

| JP | 52-018243 A | 2/1977 |
| JP | 03-071271 U | 7/1991 |

(Continued)

OTHER PUBLICATIONS

Shingo Iizumi, "Chemical Engineering Handbook (Revised 4th Edition)", Maruzen Co., Ltd, published on Oct. 25, 1978, Dec. 25, 1980, pp. 1322-1323.

(Continued)

*Primary Examiner* — Natasha Young
(74) *Attorney, Agent, or Firm* — Oblon, McClelland, Maier & Neustadt, L.L.P.

(57) ABSTRACT

A processing device and processing method that can perform processing of a starting material fluid while favorably controlling the processing temperature of same. The processing device includes: a processing member that leads in the starting material fluid and processes same therewithin; and a processing tank that houses the processing member and retains the processed processing products. The processing member includes: a minute duct provided therewithin and causes the flow-through of the starting material fluid; and a heat medium duct that causes the flow-through of a heat medium having a different temperature from that of the starting material fluid flowing through the minute duct. The minute duct and the heat medium duct are separated from each other so that heat exchange is possible between the starting material fluid and heat medium flowing through.

8 Claims, 5 Drawing Sheets

(51) Int. Cl.
*F28D 9/00* (2006.01)
*F28D 21/00* (2006.01)

(52) U.S. Cl.
CPC . *F28D 21/0017* (2013.01); *B01J 2219/00083* (2013.01); *B01J 2219/00094* (2013.01); *B01J 2219/00099* (2013.01); *B01J 2219/00105* (2013.01); *B01J 2219/00123* (2013.01); *B01J 2219/247* (2013.01); *B01J 2219/249* (2013.01); *B01J 2219/2453* (2013.01); *B01J 2219/2462* (2013.01); *B01J 2219/2485* (2013.01); *B01J 2219/2487* (2013.01); *B01J 2219/2497* (2013.01)

(58) Field of Classification Search
CPC .... B01J 2219/00049; B01J 2219/00051; B01J 2219/00074; B01J 2219/00076; B01J 2219/00083; B01J 2219/00087; B01J 2219/00094; B01J 2219/00099; B01J 2219/00105; B01J 2219/00123; B01J 2219/24; B01J 2219/2401; B01J 2219/245–2219/2453; B01J 2219/2461; B01J 2219/2462; B01J 2219/2469; B01J 2219/247; B01J 2219/2476; B01J 2219/2483; B01J 2219/2485; B01J 2219/2487; B01J 2219/249; B01J 2219/2491; B01J 2219/2497; F28D 9/00; F28D 9/0031; F28D 9/0037; F28D 21/00; F28D 21/0017

See application file for complete search history.

(56) References Cited

FOREIGN PATENT DOCUMENTS

| | | |
|---|---|---|
| JP | 05-034082 A | 2/1993 |
| JP | 11-333201 A | 12/1999 |
| JP | 2000-084387 A | 3/2000 |
| JP | 2009-18280 A | 1/2009 |
| JP | 2011-178678 A | 9/2011 |
| WO | WO 2006/120945 A1 | 11/2006 |

OTHER PUBLICATIONS

International Search Report and Written Opinion issued on May 27, 2014 for PCT/2014/002040 filed on Apr. 9, 2014.

* cited by examiner

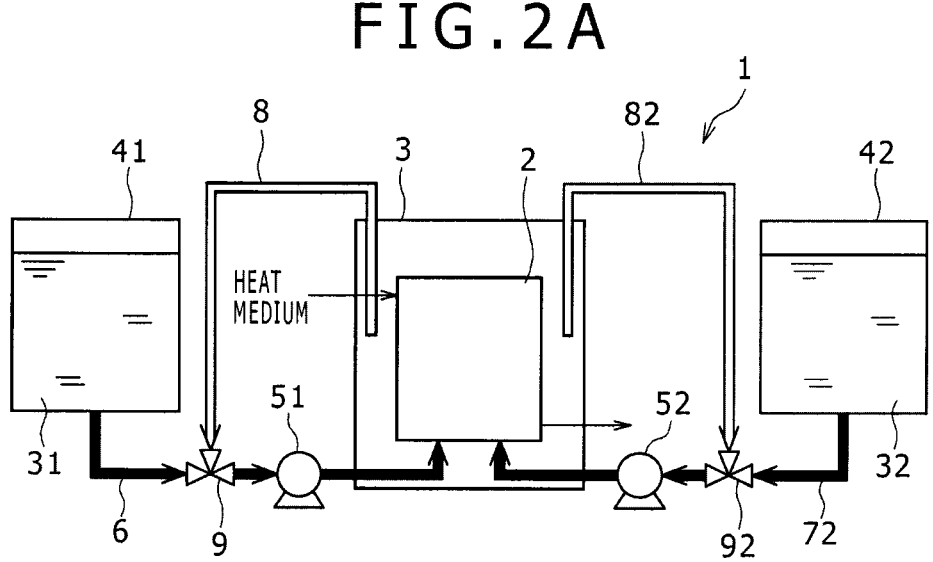
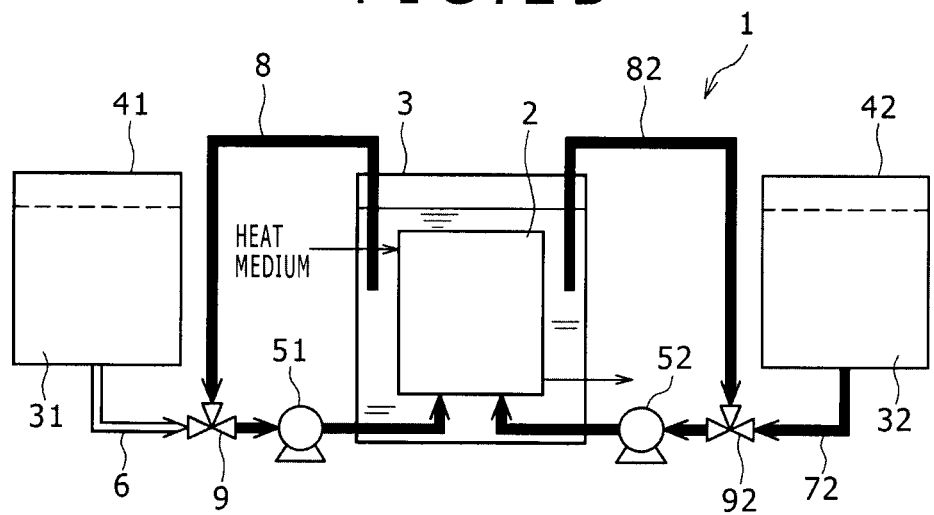

PROCESSING DEVICE AND PROCESSING METHOD

This application is the U.S. National Phase of PCT Application No. PCT/JP2014/002040, now WO 2014/174781, filed Apr. 9, 2014, which claims priority to Japanese Application No. JP2013-089305, filed Apr. 22, 2013, the disclosure of which are incorporated in their entirety by reference herein.

TECHNICAL FIELD

The present invention relates to a processing device and a processing method in which a material fluid can be subjected to a chemical process such as extraction, separation, and reaction while finely adjusting a processing temperature.

BACKGROUND ART

For example, as in a case where synthesis of organic compounds or the like is performed, there is sometimes a case where a material fluid supplied into a processing bath is subjected to a chemical process such as extraction, separation, and reaction while finely adjusting a processing temperature. This process requires provision of a temperature regulation mechanism inside the processing bath and strict control of the processing temperature (reaction temperature). As the temperature regulation mechanism, for example, a coil shape heat exchanger, a temperature-regulating jacket, and the like are used.

The heat exchanger is used while being immersed in the material fluid stored in the processing bath. The heat exchanger has a spiral shape pipe made of metal excellent in thermal conductivity. (For example, refer to FIG. 5B). A heated or cooled heat medium is circulated inside this spiral shape pipe, and by performing heat exchange between this heat medium and the material fluid through a pipe wall of the pipe, the temperature of the material fluid can be adjusted to be a desired processing temperature.

The temperature-regulating jacket is a hollow member arranged so as to surround the processing bath, and a heat medium can be accumulated inside the temperature-regulating jacket. Therefore, as well as the above heat exchanger, by supplying a heat medium at a desired temperature into the temperature-regulating jacket, heat exchange can be performed between the heat medium and the material fluid via a bath wall of the processing bath. Thereby, the temperature of the material fluid can be adjusted to be a target processing temperature.

In a case of the temperature regulation mechanism in which the heat exchanger or the temperature-regulating jacket is used, a surface of the heat exchanger or an inner wall surface of the processing bath where the temperature-regulating jacket is attached is heated or cooled much more than other places. Thus, great temperature variation easily occurs inside the processing bath. Therefore, in a case where the temperature regulation mechanism described above is used, in general, an agitating means as shown in Non-patent Document 1 is provided inside the processing bath so as to agitate the material fluid in the processing bath, and the process is performed while equalizing the temperature of the material fluid inside the processing bath as far as possible.

However, even when the material fluid is agitated in the reaction bath by the agitating blade or the like, a lot of time is required for heating and cooling in a case of a large heat capacity of the processing bath. In particular, with the heat exchanger and the temperature-regulating jacket described above, a heat transmission area to be ensured on a surface of the coil and the jacket is limited. Thus, speed-up of heating and cooling is also limited.

As a matter of course, the speed-up of heating and cooling by strengthening of agitation by the agitating blade or an increase in a temperature difference between the material fluid and the heat medium can be expected. However, depending on the type of the material fluid, excessively strong agitation invites segmentation of the material fluid, and there is sometimes a case where it takes a rather long time for separating the segmentalized material fluid into the original simple material fluid. There is also a fear that an excessive increase in the temperature difference between the material fluid and the heat medium invites thermal decomposition of the material fluid. Thus, there is sometimes a case where it becomes difficult to adopt the increase.

Therefore, in the conventional processing device and the processing method, even when agitation is performed by the agitating blade, it is actually difficult to adjust the temperature of the material fluid for a short time or to precisely control the temperature.

CITATION LIST

Patent Document

Non-patent Document 1: Iizumi Shingo, Oct. 25, 1978. Chemical engineering handbook 4th ed. Maruzen Co., Ltd. P. 1322-1323 (second impression: Dec. 25, 1980)

SUMMARY OF THE INVENTION

An object of the present invention is to provide a processing device and a processing method in which a material fluid can be subjected to a process while favorably controlling a processing temperature of the material fluid.

The present invention is to provide a processing device for subjecting a material fluid to a process while controlling a processing temperature of the material fluid. This processing device includes a processing member into which the material fluid is guided and subjected to the process inside, and a processing bath that accommodates the processing member and stores a processing product provided by the process in the processing member. The processing member has at least one minute flow passage provided inside the processing member, the minute flow passage inside which the material fluid is circulated, and at least one heat medium flow passage provided inside the processing member, the heat medium flow passage inside which a heat medium having a temperature different from the temperature of the material fluid circulated in the at least one minute flow passage is circulated, and the at least one minute flow passage and the at least one heat medium flow passage are isolated from each other in such a manner that heat exchange is capable of being performed between the material fluid flowing through the minute flow passage and the heat medium flowing through the heat medium flow passage.

The present invention is also to provide a processing method for subjecting a material fluid to a process while controlling a processing temperature of the material fluid. This processing method includes the steps of preparing a processing device which includes a processing member having minute and heat medium flow passages isolated from each other, the processing member into which the material fluid is guided and subjected to the process inside, and a processing bath that accommodates the processing member and stores a processing product provided by the process in the processing member, and adjusting the processing temperature of the material fluid in the minute flow passage by circulating the material fluid in the minute flow passage of the processing member, circulating a heat medium having a temperature different from the temperature of the material fluid circulated in the minute flow passage in the heat medium flow passage, and performing heat exchange between the material fluid and the heat medium inside the processing member.

BRIEF DESCRIPTION OF DRAWINGS

FIG. 2A is a flowsheet showing a flow of fluids at the start of a process in a processing device of a second embodiment of the present invention.

FIG. 2B is a flowsheet showing a flow of the fluids at the end of the process in the processing device of the second embodiment.

DESCRIPTION OF EMBODIMENTS

Hereinafter, embodiments of the present invention will be described based on the drawings.

Figure 1A:
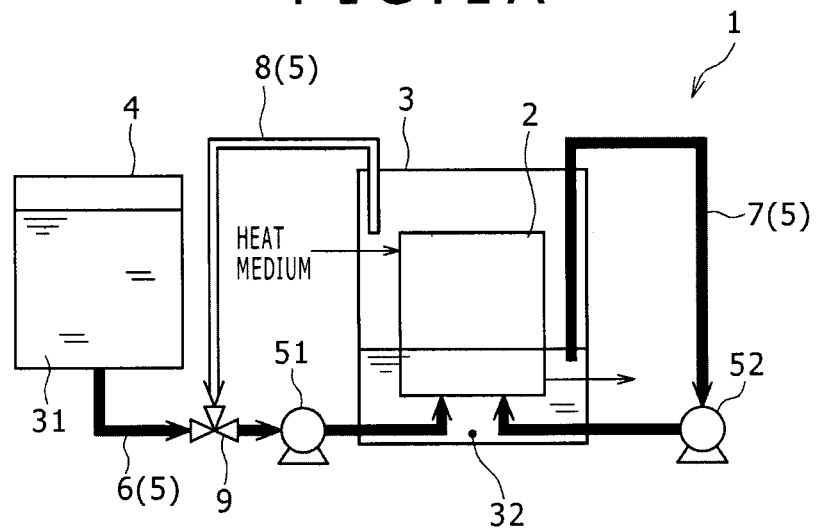
FIG. 1A is a flowsheet showing a flow of fluids at the start of a process in a processing device of a first embodiment of the present invention.
Figure 1B:
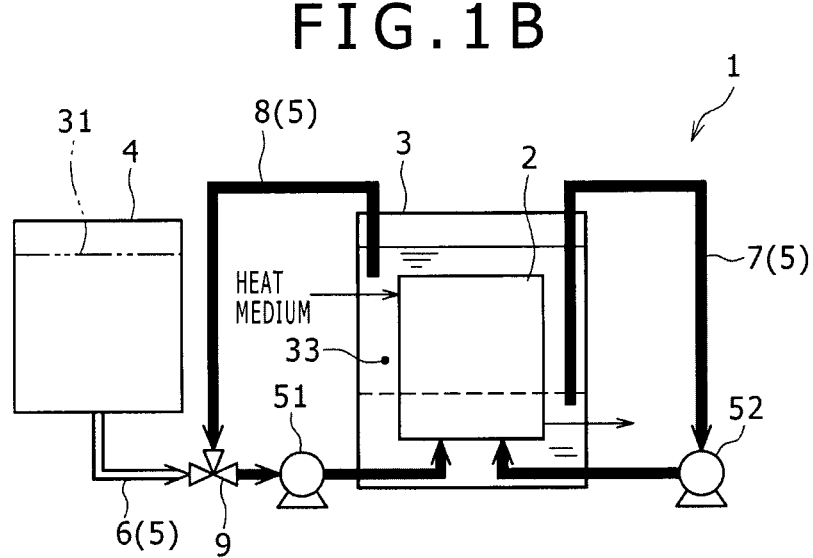
FIG. 1B is a flowsheet showing a flow of the fluids at the end of the process in the processing device of the first embodiment.

FIGS. 1A and 1B show a reaction device 1 according to a first embodiment serving as one example of a processing device according to the present invention. In the processing device according to the present invention, by using at least one type of material fluid, a chemical operation (chemical process) such as extraction, separation, and reaction is performed while adjusting a temperature of the material fluid to a predetermined processing temperature. This chemical operation includes the following operations.

For example, the processing device according to the present invention can be applied to a device in which the "reaction" is performed as the above chemical operation like the reaction device 1, specifically, a device in which a reaction product is obtained by mixing two or more types of material fluids and chemically reacting the material fluids with each other at a predetermined processing temperature. The reaction device to which the present invention can be applied includes a device into which only one type of material fluid is introduced, in other words, a device in which no mixing is performed and chemical reaction of the material fluid is performed by heating the material fluid to a predetermined processing temperature or the like.

The processing device according to the present invention can also be applied to a device in which the "extraction" is performed as the above chemical operation. Specifically, the processing device can also be applied to a liquid-liquid extraction device in which immiscible first and second material fluids, for example, a heavy solution such as water and a light solution having smaller specific gravity than the heavy solution such as oil are brought into contact with each other in a flow passage, a substance to be extracted contained in the light solution (oil) is moved to the heavy solution (water), and the substance to be extracted is taken out as a water solution.

Any of the following first to third embodiments relates to the reaction device 1 in which two or more types of material fluids are mixed and chemically reacted with each other at a predetermined temperature.

As shown in FIGS. 1A and 1B, in the reaction device 1 of the first embodiment, a first material fluid 31 and a second material fluid 32 are reacted with each other while being mixed, so as to produce a reaction product 33, that is, a processing product. This reaction device 1 includes a processing member 2 into which the first material fluid 31 and the second material fluid 32 are guided and reacted with each other while being mixed inside, a reaction bath 3 serving as a processing bath that stores the reaction product 33 obtained by the reaction in this processing member 2, a material bath 4, and a plurality of processing pipes 5. Inside the processing member 2, a plurality of minute flow passages 10 and a plurality of heat medium flow passages 11 are formed as described in detail later.

The material bath 4 is provided outside the reaction bath 3 so as to store the first material fluid 31. The second material fluid 32 serving as the other material fluid is preliminarily stored inside the reaction bath 3. The processing member 2 is immersed in the second material fluid 32 inside the reaction bath 3. The plurality of processing pipes 5 is arranged between the material bath 4 and the reaction bath 3 and around the reaction bath 3 so as to allow movement of the first material fluid 31 in the material bath 4 and the second material fluid 32 in the reaction bath 3 between the baths 3, 4.

Next, details of the reaction bath 3, the material bath 4, and the plurality of processing pipes 5 arranged between these baths 3, 4 and around the reaction bath 3 will be described.

The reaction bath 3 serving as the processing bath is a cylindrical bottomed container having an opening toward the upper side, and is capable of storing the first and second material fluids 31, 32 and the reaction product 33 obtained by the reaction of these material fluids inside. The upper opening of this reaction bath 3 is closed by a lid (not shown) or the like if necessary. Inside the reaction bath 3, the above processing member 2 can be accommodated in a state where the processing member is immersed in the material fluid or the reaction product 33.

The fluid to be accommodated in the reaction bath 3 is changed depending on a progress state of the reaction. That is, the type of the fluid accommodated in the reaction bath 3 is different between the start of processing and the end of processing. Specifically, before the reaction is started as shown in FIG. 1A, the fluid accommodated in the reaction bath 3 is only the second material fluid 32. However, once the reaction is started, the reaction product 33 is produced inside the processing member 2 and successively stored in the reaction bath 3. Thus, the fluid accommodated in the reaction bath 3 becomes a mixture of the second material fluid 32 and the reaction product 33. Then, when almost all the material fluids 31, 32 are reacted and changed as shown in FIG. 1B, the fluid accommodated in the reaction bath 3 becomes only the reaction product 33. This change in the material fluid to be accommodated in the reaction bath 3 will be described in detail later.

As shown in FIGS. 1A and 1B, the plurality of processing pipes 5 includes a first pipe 6, a second pipe 7, and a third pipe 8.

The first pipe 6 has an inlet side end connected to the material bath 4, and an outlet side end connected to the processing member 2 in the reaction bath 3. Through this first pipe 6, the first material fluid 31 is supplied from the material bath 3 toward the processing member 2.

A first pump 51 and a switching valve 9 are provided in the middle of the first pipe 6. The first pump 51 pressure-feeds the first material fluid 41 from the material bath 4 toward the reaction bath 3. The switching valve 9 switches a point to which an inlet of the pump 51 is connected between the material bath 4 storing the first material fluid 31 and the third pipe 8. In a case where the first material fluid 31 remains in the material bath 4 as shown in FIG. 1A, this switching valve 9 switches the flow passage in such a manner that the material bath 4 storing the first material fluid 31 is connected to the pump 51. Meanwhile, when all the first material fluid 31 in the material bath 4 is gone as shown in FIG. 1B, the switching valve switches the flow passage in such a manner that the reaction product 33 is fed to the pump 51 while merging the fluid in the reaction bath 3 (mixture of the reaction product 33 and the unreacted second material fluid 32) into the first material fluid 31 in the first pipe 6 via the third pipe 8 to be described in detail later.

The second pipe 7 has an inlet side end provided inside the reaction bath 3, and an outlet side end coupled to the processing member 2, and is arranged so as to suction and supply the second material fluid 32 preliminarily stored in the reaction bath 3 and the reaction product 33 into the processing member 2 again. The inlet side end of this second pipe 7 is attached at a low position inside the reaction bath 3, the position where the second pipe can suction the second material fluid 32 preliminarily stored in the reaction bath 3 at the start of processing. In the middle of the second pipe 7, a pump 52 that pressure-feeds the second material fluid 32 or the reaction product 33 through this second pipe 7 is arranged.

Specifically, this second pipe 7 is arranged along a route of once extending toward the outside of the reaction bath 3 from the inlet side end provided inside the reaction bath 3, going via the second pump 52 provided outside the reaction bath 3, and then returning into the processing member 2 again. That is, in a case where the fluid stored in the reaction bath 3 is almost the second material fluid 32 as shown in FIG. 1A, this second material fluid 32 is circulated in the second pipe 7. However, when the reaction product 33 is also stored in the reaction bath 3 in addition to the second material fluid 32 as shown in FIG. 1B, the mixture of the second material fluid 32 and the reaction product 33 is circulated in the second pipe 7. Therefore, the second pipe 7 can also be called as a pipe in which the second material fluid 32 is reacted while being circulated between the processing member 2 and the reaction bath 3.

The third pipe 8 is used for supplying the unreacted first material fluid 31 stored in the reaction bath 3 into the processing member 2 again after feeding almost all the first material fluid 31 in the material bath 4 to the processing member 2 through the first pipe 6 and reacting, so as to enhance a reaction rate. This third pipe 8 has an inlet side end and an outlet side end, and the outlet side end is connected to the switching valve 9. The inlet side end, that is, the end on the suction side of the third pipe 3 is attached to a relatively high position inside the reaction bath 3. This position is set to be a position where the third pipe can suction the second material fluid 32 and the reaction product 33 only after the reaction progresses to some extent, a large amount of the reaction product 33 is stored in the reaction bath 3, and a liquid level in the reaction bath 3 becomes higher than predetermined height.

The processing member 2 is accommodated inside the above reaction bath 3 (processing bath), and the material fluids are guided inside and chemical reaction of the material fluids is performed inside. Specifically, this processing member 2 has the plurality of minute flow passages 10 formed inside the processing member 2 so as to allow circulation of the material fluids. The first and second material fluids 31, 32 are supplied into and mixed inside the minute flow passages 10 and thereby reacted with each other so as to produce the reaction product 33. Similarly, inside the processing member 2, the plurality of heat medium flow passages 11 in which a heat medium having a temperature different from the temperature of the material fluid circulated in the minute flow passages 10 can be circulated is formed. The minute flow passages 10 and the heat medium flow passages 11 are formed so as to be isolated from each other in such a manner that heat exchange can be performed between the material fluid flowing through the minute flow passages 10 and the heat medium flowing through the heat medium flow passages 11 inside the processing member 2.

Next, details of the processing member 2 and the plurality of minute flow passages 10 and the plurality of heat medium flow passages 11 formed in this processing member 2 will be described.

In the processing member 2, the first material fluid 31 supplied through the first pipe 6 and the second material fluid 32 supplied through the second pipe 7 are brought into contact and reacted with each other in the minute flow passages 10, so that the consequently-obtained reaction product 33 can be taken out.

Figure 4:
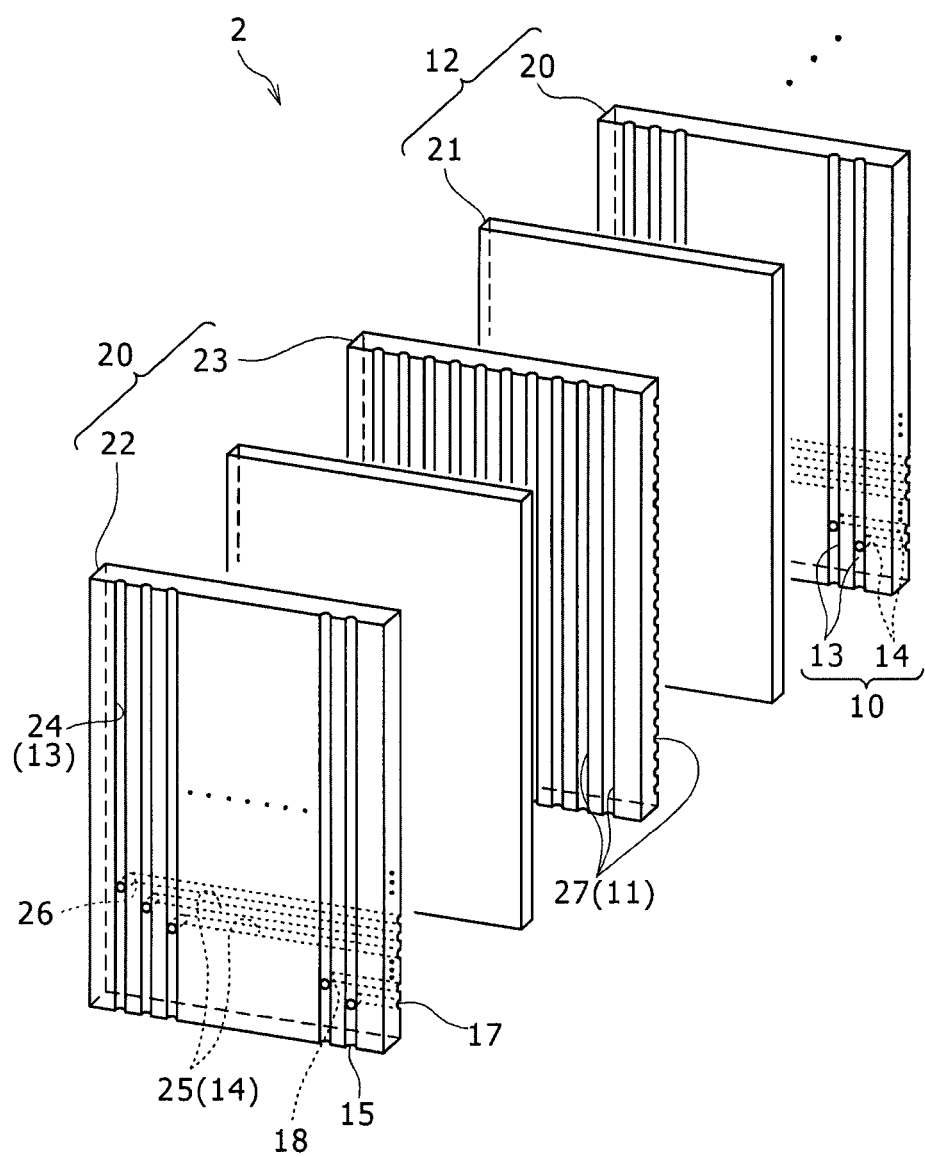
FIG. 4 is a perspective view showing a plurality of single plate members forming a processing member in the processing device.

This processing member 4 has a plate shape main body 12 elongated along the up and down direction as shown in FIG. 4. This main body 12 is made of metal, synthetic resin, ceramics, or the like having corrosion resistance and heat resistance with respect to the first and second material fluids 31, 32 and the reaction product 33, and has an outer appearance of a thick plate shape (square shape) with relatively great thickness in the plate thickness direction. The plurality of minute flow passages 10 is formed inside the main body 12 so as to pass through the main body 12 in the up and down direction or the horizontal direction, and plural rows of the minute flow passages are formed so as to line up in the plate thickness direction. The first and second material fluids 31, 32 can be brought into contact and reacted with each other, that is, subjected to a process inside the respective minute flow passages 10. The minute flow passages 10 favorably have width of for example about 0.1 mm to 5.0 mm.

Each of the plurality of heat medium flow passages 11 is formed between the minute flow passages 10 adjacent to each other in the plate thickness direction inside the processing member 2, and allows circulation of the heat medium for adjusting the temperatures of the material fluids 31, 32 and the reaction product 33 circulated in the minute flow passages 10. Plural rows of the heat medium flow passages 11 are provided so as to pass through the main body 12 of the processing member 2 in the up and down direction or the horizontal direction in correspondence with the minute flow passages 10. That is, inside the processing member 2, the minute flow passages 10 and the heat medium flow passages 11 are spaced from each other in the plate thickness direction and arranged so as to alternately line up in the plate thickness direction.

Specifically, the plurality of minute flow passages 10 respectively includes reaction flow passages 13 passing through the main body 12 of the processing member 2 in the up and down direction, and merging flow passages 14 extending in the horizontal direction in the main body 12.

As shown in FIG. 4, in each of the reaction flow passages 13, by reacting the first material fluid 31 supplied through the first pipe 6 in the reaction flow passage 13 while guiding the first material fluid along the reaction flow passage 13, the reaction product 33 is produced. Since this reaction flow passage 13 passes through the inside of the main body 12 in the up and down direction as described above, the reaction flow passage has a first intake port 15 opened on a bottom surface of the main body 12. The above first pipe 6 is connected to this first intake port 15, and the first material fluid 31 taken in (suctioned) from the material bath 4 is guided to the upper side through the inside of the main body 12. The reaction flow passage 13 also has a take-out port 16 opened on an upper surface of the main body 12, and the already-reacted reaction product 33 is taken out through this take-out port 16. In such a way, the reaction product 33 taken out from the take-out port 16 is fed to the reaction bath 3 and stored.

In each of the merging flow passages 14, the second material fluid 32 supplied through the second pipe 7 is merged into the first material fluid 31 flowing through the reaction flow passage 13. The merging flow passage 14 extends in the main body 12 of the processing member 2 along the direction orthogonal to the reaction flow passage 13, that is, the horizontal direction. An outer end of the merging flow passage 14 forms a second intake port 17 opened on a side surface of the main body 12 of the processing member 2. That is, the merging flow passage 14 is formed so as to extend from the second intake port 17 in the horizontal direction in the main body 12. The above second pipe 7 is connected to the second intake port 17, and the second material fluid 32 fed via this second pipe 7 can be supplied into the merging flow passage 14. An inner end of the merging flow passage 14 forms a merging port 18 connected to an up-down intermediate part of the reaction flow passage 13 corresponding to this merging flow passage, and allows the second material fluid 32 flowing through the merging flow passage 14 to be merged into the fluid flowing in the reaction flow passage 13 from the merging port 18.

The heat medium flow passages 11 allow the circulation of the heat medium for adjusting the temperatures of the material fluids flowing through the minute flow passages 10 which include the above reaction flow passages 13 and the merging flow passages 14 respectively, and are respectively formed at positions away from the minute flow passages 10 by a predetermined distance along the plate thickness direction inside the main body 12 of the processing member 2. The heat medium flow passages 11 are arranged so as to be parallel to the minute flow passages 10, that is, not to cross the minute flow passages 10.

That is, the minute flow passage 10 and the heat medium flow passage 11 corresponding to this are arranged so as to be adjacent to each other through a thin partition wall in the plate thickness direction. Therefore, heat exchange can be performed between the heat medium circulated in the heat medium flow passage 11, the heat medium having the temperature different from the temperature of the material fluid flowing through the minute flow passage 10, and the material fluid flowing through the minute flow passage 10.

Therefore, by adjusting the temperature of the heat medium flowing through the heat medium flow passage 11 adjacent to the minute flow passage 10, the temperature of the fluid flowing through the minute flow passage 10 can be precisely adjusted.

In order to form the above plurality of minute flow passages 10 and the plurality of heat medium flow passages 11 inside the processing member 2, for example the following method can be adopted.

Firstly, as shown in FIG. 4, a plurality of single plate members 20 and a plurality of isolation plates 21 formed in rectangles in which height serving as size in the up and down direction is greater than width serving as size in the horizontal direction are prepared. The single plate members 20 and the isolation plates 21 are alternately laminated in such as manner that along the plate thickness direction, the isolation plate 21 is arranged next to one of the single plate members 20, and another one of the single plate members 20 is arranged next to this isolation plate 21. Thereby, the above plurality of minute flow passages 10 and the plurality of heat medium flow passages 11 are formed inside the processing member 2.

Each of the single plate members 20 is a plate shape member having the same height and width as those of each of the isolation plates 21 but having thickness greater than thickness of the isolation plate 21. The plurality of single plate members 20 includes a plurality of first single plate members 22 for forming the above minute flow passages 10, and a plurality of second single plate members 23 for forming the heat medium flow passages 11. The first single plate members 22 and the second single plate members 23 are arranged so as to alternately line up in the plate thickness direction respectively via the isolation plates 21.

Each of the first single plate members 22 has a front surface and a back surface. On the front surface among the surfaces, a plurality of first grooves 24 for forming the reaction flow passages 13 is formed. The first grooves 24 line up in the up and down direction and also line up so as to be spaced from each other by a predetermined gap in the horizontal direction. Each of the first grooves 24 is formed by denting the front surface to have for example a semicircular section, and formed so as to guide the first material fluid 41 along the up and down direction.

A plurality of second grooves 25 for forming the merging flow passages 14 is formed on the back surface of the first single plate member 22. The second grooves 25 extend in the horizontal direction so as to orthogonal to the first grooves 24, and are formed so as to line up so as to be spaced from each other by a predetermined distance in the up and down direction. Each of the second grooves 25 is also formed by denting the back surface in a recessed shape to have a predetermined section, and formed so as to guide the second material fluid 32 along the horizontal direction along this dented part.

Among the plurality of second grooves 25, the second groove placed on the upper side is longer than the second groove placed on the lower side. Therefore, in the second groove 25 placed on the upper side, the second material fluid 32 can be merged into the first material fluid 31 flowing through the reaction flow passage 13 placed at a position more distant from the second intake port 17 than in the second groove 25 placed on the lower side.

Inside the first single plate member 22, a plurality of through holes 26 respectively connecting the first grooves 24 on the front surface and the second grooves 25 on the back surface is formed. Each of the through holes 26 is formed at a position where the first groove 24 on the front surface and the second groove 25 on the back surface cross each other along the plate thickness direction. In such a way, the through holes 26 allow the second material fluid 42 flowing through the second grooves 25 to be merged into the first material fluid 41 flowing through the first grooves 24 through the through holes 26. That is, openings of the through holes 26 in the first grooves 24 correspond to the above "merging ports 18 of the merging flow passages 14 with respect to the reaction flow passages 13."

Meanwhile, each of the second single plate members 23 has a front surface and a back surface as well as the first single plate member 22, and a plurality of third grooves 27 for forming the heat medium flow passages 11 is formed on both the surfaces. The third grooves 27 extend along the up and down direction or the horizontal direction. Regarding the forming direction of the third grooves 27, the third grooves may be formed along the up and down direction or may be formed along the left and right direction on both the front and back surfaces. It should be noted that in the example shown in FIG. 4, the third grooves 27 formed on the front surface of the second single plate member 23 extend along the up and down direction, and the third grooves 27 formed on the back surface of the second single plate member 23 are formed along the horizontal direction. However, all the third grooves 27 formed on the front and back surfaces may extend in the up and down direction, or all the third grooves 27 formed on the front and back surfaces may extend in the horizontal direction. Alternatively, all the third grooves may extend in the oblique direction. As well as the first groove 24 and the second groove 25, each of the third grooves 27 is formed by denting so as to have a section in a predetermined shape such as a semi-circular section, and formed so as to guide the heat medium along the up and down direction or the horizontal direction.

Each of the isolation plates 21 has a front surface and a back surface but serves as a flat plate in which no grooves are formed on these surfaces. By being laminated between the first single plate member 22 and the second single plate member 23, the isolation plate closes the first to third grooves 24, 25, 27 in the plate thickness direction so as to form the above reaction flow passages 13, the merging flow passages 14, and the heat medium flow passages 11. Specifically, by being laminated on the front surface of the first single plate member 22, the isolation plate 21 closes the first grooves 24 in the plate thickness direction so that the first grooves 24 can be utilized as the reaction flow passages 13. By being laminated on the back surface of the first single plate member 22, the isolation plate 21 closes the second grooves 25 in the plate thickness direction so that the second grooves 25 can be utilized as the merging flow passages 14. Further, by being laminated respectively on the front surface and the back surface of the second single plate member 23, the isolation plate 21 closes the third grooves 27 in the plate thickness direction so that the third grooves 27 can be utilized as the heat medium flow passages 11.

Therefore, by laminating the first single plate members 22, the second single plate members 23, and the isolation plates 21 in the order of the first single plate member 22, the isolation plate 21, the second single plate member 23, the isolation plate 21 which is different from the above isolation plate 21, and the first single plate member 22 which is different from the above first single plate member 22 along the plate thickness direction, the processing member 2 in which the plurality of reaction flow passages 13, the plurality of merging flow passages 14, and the plurality of heat medium flow passages 11 are respectively formed in attachment parts between the plate members adjacent to each other can be easily formed.

Next, a method of performing a reaction operation by using the reaction device 1 serving as the above processing device, in other words, a reaction method serving as one example of a processing method according to the present invention will be described. The following description relates to a case where the second material fluid 32 is stored in a lower part of the reaction bath 3 of the reaction device 1, the first material fluid 31 is stored in the material liquid bath 4, and the reaction product 33 is produced by reaction between the first material fluid 31 and the second material fluid 32 and taken out.

As shown in FIG. 1A, firstly, the first material fluid 31 stored inside the material liquid bath 4 is suctioned into the first pipe 6 by the first pump 51, and pressured-fed to the processing member 2 accommodated inside the reaction bath 3 through this first pipe 6. The inlet side end of this first pipe 6 is connected to the material bath 4 in which the first material fluid 31 is stored, and the outlet side end is connected to the minute flow passages 10 formed inside the processing member 2, accurately to the first intake ports 15 of the reaction flow passages 13. Thus, by using the first pump 51 and the first pipe 6, the first material fluid 31 of the material bath 4 taken into the first pipe 6 can be supplied to the reaction flow passages 13.

Meanwhile, the second material fluid 32 preliminarily stored inside the reaction bath 3 is suctioned out by the second pump 52 and pressure-fed to the processing member 2 accommodated in the reaction bath 3 through the second pipe 7. The inlet side end of the second pipe 7 is placed in the lower part of the reaction bath 3 in which the second material fluid 32 is stored, and the outlet side end of the second pipe 7 is connected to the minute flow passages 10 formed inside the processing member 2, accurately to the second intake ports 17 of the merging flow passages 14. Thus, by using the second pump 52 and the second pipe 7, the second material fluid 32 taken from the reaction bath 3 into the second pipe 7 can be supplied to the merging flow passages 14.

In such a way, the first material fluid 31 supplied to the reaction flow passages 13 and the second material fluid 32 supplied to the merging flow passages 14 are mixed and reacted in the reaction flow passages 13 placed on the upper side (downstream side) of the merging ports 18, so that the reaction product 33 is produced by the reaction.

Meanwhile, inside the processing member 2, the heat medium flow passages 11 are formed at a position isolated from the minute flow passages 10 by a distance in the plate thickness direction. Thus, by supplying and circulating the heat medium having the temperature adjusted to be a predetermined reaction temperature in these heat medium flow passages 11, the temperatures of the material fluids 31, 32 flowing through the minute flow passages 10 can be adjusted to be a predetermined reaction temperature.

Specifically, the heat medium flow passages 11 are formed at the position isolated from the reaction flow passages 13 of the minute flow passages 10 by a thickness amount of the isolation plate 21. Thus, by using heat supplied from the heat medium which is circulated in the heat medium flow passages 11, the first material fluid 31 flowing through the reaction flow passages 13 can be heated or cooled to have a predetermined reaction temperature.

On the opposite side of the reaction flow passages 13, the heat medium flow passages 11 are also formed at a position isolated from the merging flow passages 14 of the minute flow passages 10 by the thickness amount of the isolation plate 21. Thus, by using heat supplied from the heat medium which is circulated in the heat medium flow passages 11, the second material fluid 32 flowing through the merging flow passages 14 can be heated or cooled to a predetermined reaction temperature.

Therefore, when the heat medium is supplied to the heat medium flow passages 11, the heat is transmitted from the heat medium to the first and second material fluids 31, 32 in the minute flow passages 10 respectively adjacent to the heat medium flow passages 11. Thereby, while accurately maintaining the temperatures of the first and second material fluids 32 to a preliminarily fixed reaction temperature, the first and second material fluids 31, 32 can be surely reacted with each other.

In such a way, the reaction product 33 produced by the reaction inside the reaction flow passages 13 is taken out to the outside of the processing member 2 through the take-out ports 16 formed by upper ends of the minute flow passages 10 and stored in the reaction bath 3. Therefore, when the reaction progresses as shown in FIG. 1B, all the first material fluid 31 originally placed in the material bath 4 is moved to the reaction bath 3 and used for the reaction inside the minute flow passages 10. Thereby, the already-reacted material fluid is stored in the reaction bath 3.

It should be noted that in a case where the reaction is not completed only with one-time circulation in the minute flow passages 10, in other words, in a case where the unreacted material fluid remains in the reaction bath 3 after the one-time circulation, by supplying the reaction product 33 stored in the reaction bath 3 and the unreacted first and second material fluids 31, 32 into the processing member 2 again through the second pipe 7 and the third pipe 8, a reaction rate of the first and second material fluids 31, 32 can also be enhanced.

When the above reaction device 1 is used, the first material fluid 31 in the material bath 4 and the second material fluid 32 of the reaction bath 3 are finely distributed into the minute flow passages 10 and then reacted in the minute flow passages 10. Thus, even when agitation is not performed by using an agitation blade or the like, the first and second material fluids 31, 32 can be surely mixed and reacted inside the minute flow passages 10. Therefore, unlike a case where the agitation blade is used, a disadvantage of segmentation of the material fluids is not added.

Inside the processing member 2, the heat medium flow passages 11 in which the heat medium capable of heating or cooling the material fluids flowing through the minute flow passages 10 is circulated are formed at positions adjacent to the minute flow passages 10. In the minute flow passages 10 and the heat medium flow passages 11, heat exchange can be performed between the material fluids 31, 32 and the heat medium while ensuring a very large heat exchange area. All the minute flow passages 10 and the heat medium flow passages 11 are provided inside the processing member 2 and hence unsusceptible to a temperature of an exterior. Therefore, by the circulation of the heat medium in the heat medium flow passages 11, the temperatures of the material fluids flowing through the minute flow passages 10 can be selectively and precisely adjusted to be a target reaction temperature for a short time. It does not take a long time for adjustment of the temperature of the reaction bath 4.

Figure 5A:
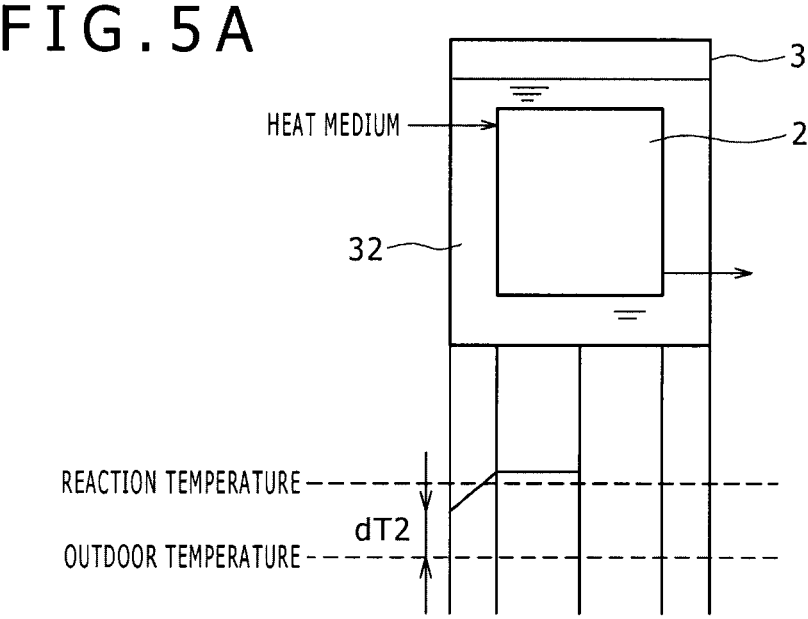
FIG. 5A is a view showing temperature distribution of a material fluid inside a processing bath in the processing device shown in FIGS. 1A and 1B.
Figure 5B:
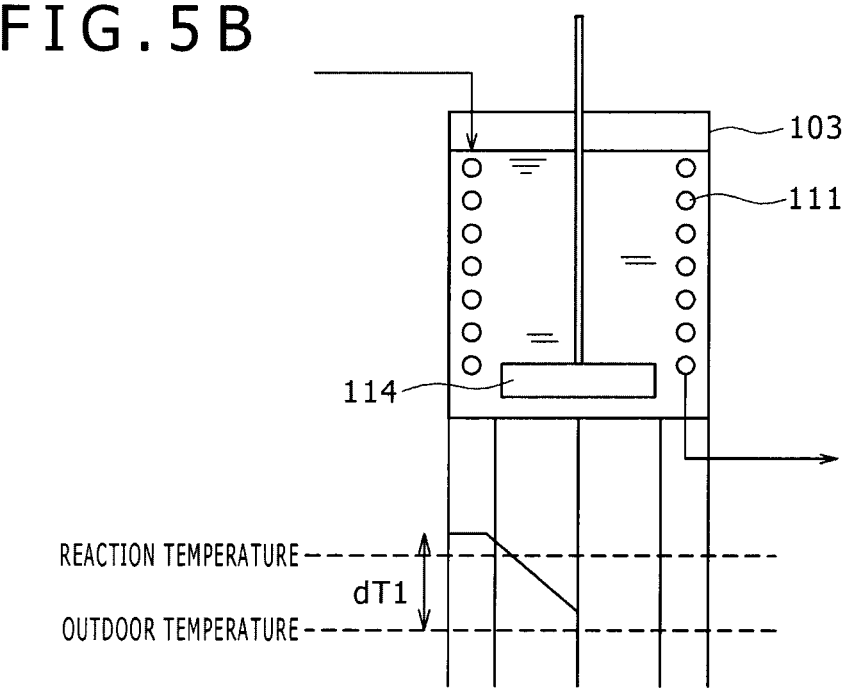
FIG. 5B is a view showing temperature distribution of a material fluid inside a processing bath in a conventional processing device.

For example, as in a processing device shown in FIG. 5B, in a processing device including a reaction bath 103 and a coil shape metal pipe 111 accommodated in this reaction bath, in which a temperature is adjusted by supplying a heat medium into the pipe 111, when agitation is performed by using an agitation blade 114 shown in FIG. 5B for example, a great temperature gradient (indicated as a temperature difference dT1 between a bath wall and a bath center in FIG. 5B) remains inside the reaction bath 103. That is, in the example shown in FIG. 5B, a temperature in the vicinity of an inner wall surface of the reaction bath 103 where the temperature-regulating pipe 111 is provided is high. However, a temperature on the center side of the reaction bath 103 away from the pipe 111 is largely influenced by an external air temperature and conversely low. Thus, the temperature difference in the bath is very large, so that it becomes difficult to perform a process such as reaction under a uniform temperature condition.

However, as shown in FIG. 5A, in temperature regulation by using the above processing member 2, a temperature gradient (indicated as a temperature difference dT2 between a bath wall and a bath center in FIG. 5A) inside the reaction bath 3 is small, and the reaction is performed in a state unsusceptible to the external air temperature. Thus, the process such as reaction can be performed while substantially uniformly maintaining the temperatures of the material fluids.

From the above description, when the reaction device 1 of the first embodiment is used, and even in a case where the reaction bath 3 serving as the processing bath has a large heat capacity, a chemical operation such as extraction, separation, and reaction can be performed for a short time while strictly controlling the processing temperature with high precision.

Next, with using FIGS. 2A and 2B, the reaction device 1 of the second embodiment will be described.

As shown in FIGS. 2A and 2B, the reaction device 1 of the second embodiment includes the reaction bath 3 as well as the first embodiment. However, the material fluid 32 is not preliminarily stored in the reaction bath 3 but stored in the material bath as well as the first material fluid 31. Specifically, this reaction device 1 of the second embodiment includes a second material bath 42 that stores the second material fluid 32 in addition to a first material bath 41 that stores the first material fluid 31. Both the first material bath 41 and the second material bath 42 are provided outside the reaction bath 3 as separate baths from the reaction bath 3. The first material fluid 31 and the second material fluid 32 are supplied from the first and second material baths 41, 42 respectively and individually to the processing member 2 accommodated in the reaction bath 3.

As well as the reaction device 1 of the first embodiment, the reaction device 1 of the second embodiment includes the first pipe 6 and a second pipe 72. However, the second pipe 72 among the pipes is arranged between the second material bath 42 and the second intake ports 17 of the merging flow passages 14 in the processing member 2 (refer to FIG. 4) unlike the second pipe 7 according to the first embodiment. In the middle of this second pipe 72, the second pump 52 and a switching valve 92 are provided as well as the first pump 51 and the switching valve 9 in the first pipe 6, and a fourth pipe 82 similar to the third pipe 8 is provided between the switching valve 92 in the second pipe 7 and the reaction bath 3. The second pump 52 feeds the second material fluid 32 stored in the second material bath 31 to the second intake ports 17 of the merging flow passages 14 through the second pipe 72, and with the fourth pipe 82, the material fluid in the reaction bath 3 can be merged into the second material fluid 32 flowing through the pipe 7B.

In this reaction device 1 of the second embodiment, as shown in FIG. 2A, the reaction product 33 and the material fluids 31, 32 are not at all stored in the reaction bath 3 at the start of reaction. After that, by driving the first and second pumps 51, 52, the first pump 51 pressure-feeds the first material fluid 31 to the processing member 2 (in detail, the first intake ports 15 of the reaction flow passages 13 shown in FIG. 4) through the first pipe 6, and the second pump 52 pressure-feeds the second material fluid 32 to the processing member 2 (in detail, the second intake ports 17 of the merging flow passages 14 shown in FIG. 4) through the second pipe 7B. Then, the first material fluid 31 flowing into the reaction flow passages 13 from the first intake ports 15 and the second material fluid 32 flowing into the merging flow passages 14 from the second intake ports 17 are mixed and reacted with each other inside the reaction flow passages 13 placed on the upper side of the merging ports 18 shown in FIG. 4. The reaction product 33 produced by this reaction is taken out to in the reaction bath 3 through the take-out ports 16 and stored.

By continuing the above operation, as shown in FIG. 2B, the first material fluid 31 stored in the first material bath 41 and the second material fluid 32 stored in the second material bath 42 are both gone, whereas the reaction product 33 obtained by reacting the first material fluid 31 and the second material fluid 32 fills the reaction bath 3.

At this time, in a case where the reaction of the first and second material fluids 31, 32 is not completely finished, in other words, at least one of the first material fluid 31 and the second material fluid 32 remains inside the reaction bath 3 in an unreacted state, as well as the first embodiment, in order to complete the reaction of the first and second material fluids 31, 32, the material fluid of the reaction bath 3 is returned to the processing member 2 again through the first pipe 6, the second pipes 7, 7B, and the third pipes 8, 8B and supplied for further reaction inside the processing member 2.

The above reaction device 1 of the second embodiment is favorable for such reaction of the material fluids that the total amount of the first material fluid 31 or the second material fluid 32 is firstly reacted at a predetermined reaction temperature, and after the reaction of the total amount, the reaction is desirably completed while circulating the material fluid. In a case where the second material fluid 32 is a highly volatile liquid, the second material fluid 32 is volatilized and gasified in the reaction bath 3 in the reaction device of the first embodiment. Thus, there is a fear that the material fluid 32 becomes inappropriate to be supplied into the processing member 2. However, even in such a case, the reaction device of the second embodiment can be favorably used.

Next, with using FIG. 3, the reaction device 1 of the third embodiment will be described.

Figure 3:
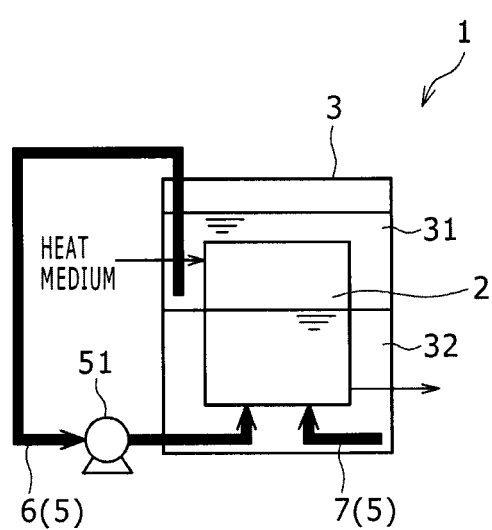
FIG. 3 is a flowsheet showing a processing device of a third embodiment of the present invention.

As shown in FIG. 3, the reaction device 1 of the third embodiment includes the processing member 2 and the reaction bath 3, and inside thereof, immiscible first and second material fluids 31, 32 having different specific gravities from each other are respectively divided and stored into an upper layer and a lower layer. The processing member 2 has the plurality of minute flow passages 10 as well as the first embodiment, and the minute flow passages 10 include the reaction flow passages 13 in which the first material fluid 31 in the upper layer taken in from an upper part of the reaction bath 3 is reacted while circulating the first material fluid, and the merging flow passages 14 in which the second material fluid 32 in the lower layer taken in from a lower part of the reaction bath 3 is merged into the first material fluid 31 in the reaction flow passages 13 through the merging ports 18 in the middle of the reaction flow passages 13 (refer to FIG. 4).

When the reaction is performed by using such a processing member 2, inside a part of the reaction flow passages 13 on the upper side of the merging ports 18, the first material fluid 31 in the upper layer and the second material fluid 32 in the lower layer are brought into contact and reacted with each other in a two-phase flow state, and the reaction product 33 produced by the reaction can be taken out in a state where the reaction product is solved in either the first material fluid 31 or the second material fluid 32.

This reaction device 1 of the third embodiment can be effectively used in a case where the first and second material fluids 31, 32 are immiscible with each other as in water and oil, and in a case where the reaction product 33 needs to be taken out in a state where the reaction product 33 is solved in a liquid or the like.

As exemplified in the above embodiments, according to the processing device of the present invention (reaction device 1 in the above embodiments) and the processing method (reaction method in the above embodiments), even in a case where the processing bath (reaction bath 3 in the above embodiments) has a large heat capacity, the chemical operation such as extraction, separation, and reaction can be surely performed while strictly controlling the processing temperature (reaction temperature in the above embodiments) with high precision.

It should be noted that the embodiments disclosed herein are thought to be not a limitation but an example in all respects. In particular, regarding matters not explicitly disclosed in the embodiments disclosed herein such as an operation condition, a production condition, various parameters, size of constituent parts, weight, and volume, values not departing from a range that those skilled in the art generally implement, the values easily anticipated by those skilled in the art in general are adopted.

For example, the processing member 2 in the above first to third embodiments includes the plurality of minute flow passages 10. However, the processing member according to the present invention may be a processing member having a single minute flow passage and a single heat medium flow passage corresponding to this, that is, a single flow passage member.

As described above, according to the present invention, the processing device and the processing method in which the material fluid can be subjected to the process while favorably controlling the processing temperature of the material fluid are provided.

The present invention is to provide a processing device for subjecting a material fluid to a process while controlling a processing temperature of the material fluid. This processing device includes a processing member into which the material fluid is guided and subjected to the process inside, and a processing bath that accommodates this processing member and stores a processing product provided by the process in the processing member. The processing member has at least one minute flow passage provided inside the processing member, the minute flow passage inside which the material fluid is circulated, and at least one heat medium flow passage provided inside the processing member, the heat medium flow passage inside which a heat medium having a temperature different from the temperature of the material fluid circulated in the at least one minute flow passage is circulated. The at least one minute flow passage and the at least one heat medium flow passage are isolated from each other in such a manner that heat exchange is capable of being performed between the material fluid flowing through the minute flow passage and the heat medium flowing through the heat medium flow passage.

The present invention is also to provide a processing method for subjecting a material fluid to a process while controlling a processing temperature of the material fluid. This processing method includes the steps of preparing a processing device which includes a processing member having minute and heat medium flow passages isolated from each other, the processing member into which the material fluid is guided and subjected to the process inside, and a processing bath that accommodates this processing member and stores a processing product provided by the process in the processing member, and adjusting the processing temperature of the material fluid in the minute flow passage by circulating the material fluid in the minute flow passage of the processing member, circulating a heat medium having a temperature different from the temperature of the material fluid circulated in the minute flow passage in the heat medium flow passage, and performing heat exchange between the material fluid and the heat medium inside the processing member.

According to the processing device and the processing method, even in a case where the processing bath has a large heat capacity, the material fluid can be subjected to the process while favorably controlling the processing temperature.

Preferably, in the processing member, the at least one minute flow passage may include a plurality of minute flow passages, and the at least one heat medium flow passage may include a plurality of heat medium flow passages. With this processing member, the material fluid can be subjected to the process more efficiently by circulating the material fluid through the plurality of minute flow passages, and the processing temperature of the material fluid can be more precisely controlled by circulating the heat medium through the plurality of heat medium flow passages.

Preferably, the at least one minute flow passage of the processing member may include a reaction flow passage in which by performing heat exchange between the material fluid and the heat medium circulated in the heat medium flow passage, reaction of the material fluid is performed while adjusting the temperature of the material fluid.

Plural types of material fluids may be circulated in the at least one minute flow passage as the material fluid.

In this case, favorably, the reaction bath stores a first material fluid and a second material fluid as the plural types of material fluids in a state where the immiscible first and second material fluids having different densities from each other are respectively divided into an upper layer and a lower layer, and the at least one minute flow passage of the processing member includes a reaction flow passage in which the second material fluid in the lower layer taken from a lower part of the reaction bath is reacted while circulating the second material fluid, and a merging flow passage in which the first material fluid in the upper layer taken from an upper part of the reaction bath is merged into the second material fluid in the reaction flow passage in the middle of the reaction flow passage.

The invention claimed is:

1. A processing device for subjecting a material fluid to a process while controlling a processing temperature of the material fluid, comprising:
   a processing member into which the material fluid is guided and subjected to the process inside; and
   a processing bath that accommodates said processing member and stores a processing product provided by the process in said processing member, wherein
   said processing member has at least one minute flow passage provided inside said processing member, the minute flow passage inside which the material fluid is circulated, and at least one heat medium flow passage provided inside said processing member, the heat medium flow passage inside which a heat medium having a temperature different from the temperature of the material fluid circulated in the at least one minute flow passage is circulated, and
   the at least one minute flow passage and the at least one heat medium flow passage are isolated from each other in such a manner that heat exchange is capable of being performed between the material fluid flowing through the minute flow passage and the heat medium flowing through the heat medium flow passage.

2. The processing device according to claim 1, wherein in said processing member, the at least one minute flow passage includes a plurality of minute flow passages, and the at least one heat medium flow passage includes a plurality of heat medium flow passages.

3. The processing device according to claim 1, wherein the at least one minute flow passage of said processing member includes a reaction flow passage in which by performing heat exchange between the material fluid and the heat medium circulated in the heat medium flow passage, reaction of the material fluid is performed while adjusting the temperature of the material fluid.

4. The processing device according to claim 1, wherein plural types of material fluids are circulated in the at least one minute flow passage as the material fluid.

5. The processing device according to claim 4, wherein said processing bath stores a first material fluid and a second material fluid as the plural types of material fluids in a state where the immiscible first and second material fluids having different specific gravities from each other are respectively divided into an upper layer and a lower layer, and
the at least one minute flow passage of said processing member includes a reaction flow passage in which the second material fluid in the lower layer taken from a lower part of said processing bath is reacted while circulating the second material fluid, and a merging flow passage in which the first material fluid in the upper layer of said processing bath is merged into the second material fluid in the reaction flow passage in the middle of the reaction flow passage.

6. The processing device according to claim 1, wherein in said processing member, the at least one minute flow passage includes a plurality of minute flow passages, and the at least one heat medium flow passage includes a plurality of heat medium flow passages, and plural types of material fluids are circulated in the at least one minute flow passage as the material fluid.

7. The processing device according to claim 1, wherein the at least one minute flow passage of said processing member includes a reaction flow passage in which by performing heat exchange between the material fluid and the heat medium circulated in the heat medium flow passage, reaction of the material fluid is performed while adjusting the temperature of the material fluid, and
plural types of material fluids are circulated in the at least one minute flow passage as the material fluid.

8. A processing method for subjecting a material fluid to a process while controlling a processing temperature of the material fluid, comprising the steps of:
   preparing a processing device which includes a processing member having minute and heat medium flow passages isolated from each other, the processing member into which the material fluid is guided and subjected to the process inside, and a processing bath that accommodates the processing member and stores a processing product provided by the process in the processing member; and adjusting the processing temperature of the material fluid in the minute flow passage by circulating the material fluid in the minute flow passage of the processing member, circulating a heat medium in the heat medium flow passage, the heat medium having a temperature different from the temperature of the material fluid circulated in the minute flow passage, and performing heat exchange between the material fluid and the heat medium inside the processing member.

* * * * *